E. WEINTRAUB.
REFRACTORY CONTAINER.
APPLICATION FILED APR. 11, 1912.

1,063,483.

Patented June 3, 1913.

Witnesses:
George H. Tilden
J. Ellis Glen

Inventor:
Ezechiel Weintraub,
by Albert G. Davis
His Attorney.

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

REFRACTORY CONTAINER.

1,063,483.  Specification of Letters Patent.  Patented June 3, 1913.

Application filed April 11, 1912. Serial No. 690,112.

*To all whom it may concern:*

Be it known that I, EZECHIEL WEINTRAUB, a citizen of the United States, residing at Lynn, county of Essex, State of Massachusetts, have invented certain new and useful Improvements in Refractory Containers, of which the following is a specification.

The present invention relates to electric furnaces and its aim is to provide an envelop or container capable of withstanding the highest temperatures obtainable in the electric furnace without fusing or giving off chemically active vapors.

I have discovered that boron nitrid is completely infusible at the highest heat of the electric arc, and unites with this valuable property, chemical inertness and very high electrical resistance even at the temperature of the carbon arc. I have also discovered that boron nitrid, especially when finely divided has the property of being self-bonding so that no binder is necessary and the purity of this material may be preserved when making containers of all kinds, such as tubes, crucibles, furnace lining and the like.

Figure 1:
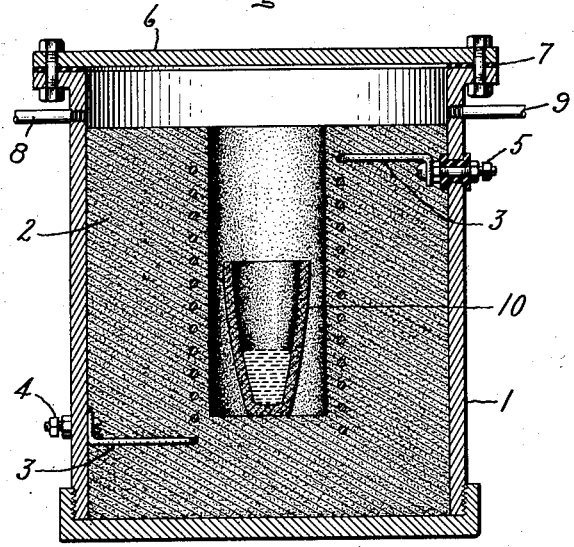
Figure 2:
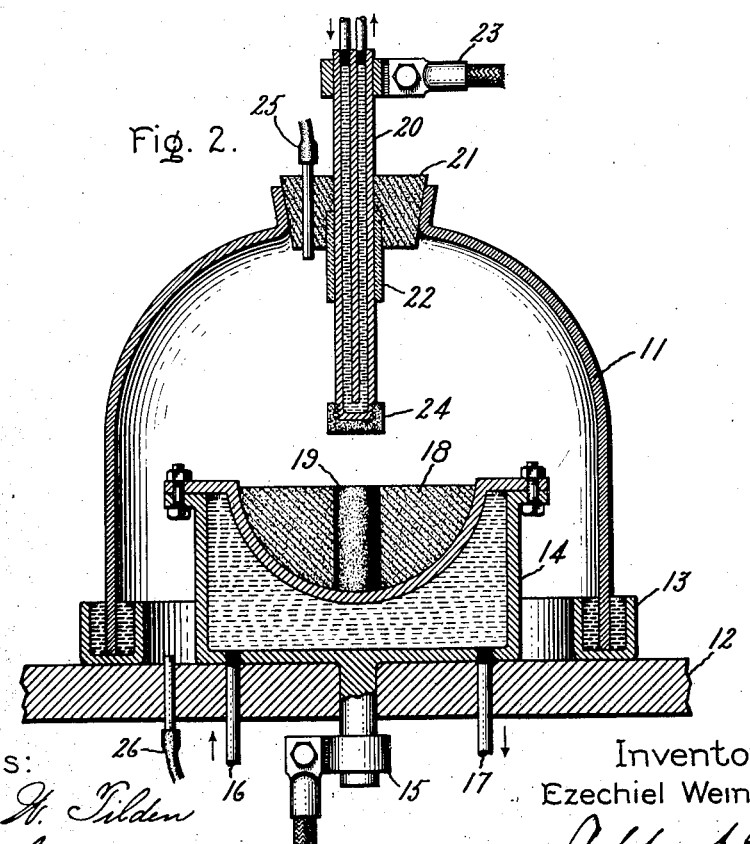

In the accompanying drawing Figure 1 illustrates a resistance furnace and Fig. 2 an arc furnace, each provided with boron nitrid linings at the zone of high temperature.

One of the chief limitations to the more complete development of the broad field of chemical activity at very high temperatures which was opened up by the electric furnace has been the difficulty of finding a material for linings, crucibles and containers in general which could withstand very high temperature without fusing and without interacting with the substance. Although many substances are described in the chemical literature as refractory or infusible, it is a matter of common knowledge that heretofore carbon has been the only material known to be actually infusible in the intense heat of the electric arc.

The physical characteristics of boron nitrid have not been investigated carefully heretofore. The older chemists who have prepared the substance found that it could not be melted in an ordinary gas flame and called it "infusible" in common with a large number of other substances. Modern requirements, among which prominently are the requirements of electric furnace work, have set a new standard so that at present the term "infusible" has received a new meaning, many substances formerly believed to be infusible being fused with ease in the electric furnace. Boron nitrid, however, I have found stands in a class by itself.

I have found that, carbon excepted, boron nitrid is the only substance which is actually infusible and apparently remains undecomposed even at the highest temperatures which I have so far been able to produce by an arc. Unlike carbon, boron nitrid has no chemical affinity to most of the refractory materials which are liable to be used as a charge in such a furnace. I also found that the electrical insulating properties of boron nitrid at elevated temperatures are superior to those of any other known substance. To give an instance, some measurements made on a disk of boron nitrid about $\frac{1}{4}''$ thick have shown that at 1200° C. with 500 volts applied no appreciable current passed. For the sake of comparison it may be mentioned that a magnesium oxid block of the same dimensions allows a considerable current to pass at 800° C. with only 110 volts applied. No knowledge has existed of the electrical insulating value at high temperatures of boron nitrid. Other nitrids such as titanium nitrid are conductors even at ordinary temperatures, and some nitrids such as silicon nitrid are easily decomposed by heat. Fig. 1 illustrates how this combination of properties of boron nitrid may be utilized in a resistance furnace. The furnace here illustrated consists of a container 1 of iron, copper or other suitable metal in which is a lining of boron nitrid 2 having embedded therein a fairly stout wire 3 of tungsten or other refractory metal. One terminal 4 of this heater is attached to the metal frame of the furnace and the other terminal 5 is insulated therefrom by an insulating bushing as indicated. The cover 6 makes an air tight seal by the use of suitable gaskets 7. The boron nitrid should be heated in an inert environment such as in a neutral gas, or in a vacuum. For this reason, the furnace is provided with pipes 8 and 9 which may be used either to pass a gas, such as hydrogen and nitrogen, in a continuous manner through the furnace, or to evacuate the furnace, in which case, of course, one of the pipes may be closed. The figure also illustrates a boron nitrid crucible 10 standing within the heating helix. The extremely low or substantially zero conductivity of boron nitrid at high temperature enables the helix to be operated at the highest temperatures obtainable with incandescent tungsten without appreciable leakage of current from turn to turn. Formerly, with the best refractory materials available, temperatures in excess of about 1700° C. could not be attained in a resistance furnace. In a boron nitrid furnace, temperatures as high as the melting point of the most refractory heaters are obtainable. Tungsten melts at a temperature of about 3200° C.

The arc furnace illustrated by Fig. 2 consists of a metallic hood 11 standing upon a base plate 12, its end dipping into a body of mercury contained in an annular trough 13. Situated within the hood and constituting one of the electrodes is a water-cooled metallic cup 14 which is provided with a terminal 15 projecting through the base plate 12. Pipes 16 and 17 provide for the introduction of a cooling fluid. Within this cup is a boron nitrid lining 18 in the center of which is supported a mass of material 19 which is to be melted and which makes electrical contact with the inner wall of the cup 14. Through the upper part of the hood projects a water-cooled metallic electrode 20 which is insulated from the hood by any suitable means such as a rubber stopper 21 and silica tube 22. Attached to one end of the electrode 20 is a terminal 23 and to the opposite or arcing end is a cap 24 consisting of tungsten, graphite or other refractory material, the choice of material depending upon the purpose for which the furnace is to be used. Tubes 25 and 26 provide for the introduction of inert gas or for evacuation, as above indicated with respect to Fig. 1. In some cases it will be desirable to provide suitable cooling means for the outside of the hood such as a water jacket or simply a blast of air furnished by a fan. In an arc furnace as here illustrated it is possible to melt the most refractory metals such as tungsten, molybdenum, titanium and the like by means of an arc without in the least affecting the boron nitrid lining or introducing any impurities into the tungsten. It is impossible to accomplish this in a container consisting of any other known material.

Boron nitrid can be prepared by any one of the methods recommended in the literature, such as passing ammonia over boric anhydrid mixed with calcium phosphate at a red heat or by passing ammonia over amorphous boron or by bringing together boron chlorid and ammonia and decomposing afterward the double compound formed. A way which I find very convenient is to mix magnesium, boric anhydrid and ammonium chlorid in proportions of one part magnesium, two parts boric anhydrid and three parts ammonium chlorid and heat this up to dull red and then wash the product. This method is described and claimed in a copending application, Serial No. 688,037 filed on April 2, 1912, by Richard Heyder. I find, however, that no matter which one of these methods is used the product is not pure boron nitrid and this fact was more or less known to the chemists who prepared boron nitrid before. In methods starting with boric anhydrid, the only methods which are capable of giving large quantities of boron nitrid at a reasonable cost, the boron nitrid produced contains oxygen; probably the oxygen is in form of boric anhydrid absorbed by boron nitrid or else in form of boron oxynitrid. It was found, however, that if this impure boron nitrid is heated up to a very high temperature, say betwen 1500° C. and 2500° C. the impurities, the chief of which is boric anhydrid, volatilize out and an excellent product is obtained which in many cases where it is desired to reach very high temperatures is preferable to the impure boron nitrid. This method and product forms no part of my invention and is described and claimed in a co-pending application filed by George Weintraub, February 3, 1913, Serial No. 745,819.

Crucibles and other articles can be made by simply molding the boron nitrid in a suitable mold under a pressure of a few hundred pounds. The resulting article is strong, and can be easily handled.

What I claim as new and desire to secure by Letters Patent of the United States, is:—

1. An envelop for a furnace operable at temperatures exceeding 1700° C., consisting of a compressed mass of boron nitrid, which is chemically inert and infusible at the highest temperatures obtainable in said furnace.

2. A molded envelop consisting of compressed self-bonded boron nitrid, which is inert, infusible and a substantial non-conductor of electricity at the highest obtainable temperatures.

3. The combination of an electrical working conductor adapted to be raised to a high temperature, an insulating envelop therefor consisting of compressed boron nitrid and a metal casing surrounding and supporting said boron nitrid envelop.

4. In a furnace, a container consisting of boron nitrid, means for maintaining an inert environment about said container and means for heating said container to temperatures exceeding 1700° C.

5. In a heating device, the combination of an electrical working conductor adapted to be raised to a high temperature, an insulating envelop of compressed boron nitrid therefor, a metal casing therefor and means for introducing an inert gas into said casing.

In witness whereof, I have hereunto set my hand this eighth day of April 1912.

EZECHIEL WEINTRAUB.

Witnesses:
JOHN A. McMANUS, Jr.,
FRANK G. HATTIE.